United States Patent
Donovan

(10) Patent No.: US 9,253,163 B2
(45) Date of Patent: *Feb. 2, 2016

(54) METHODS, SYSTEMS, AND COMPUTER READABLE MEDIA FOR ENCRYPTING DIAMETER IDENTIFICATION INFORMATION IN A COMMUNICATION NETWORK

(71) Applicant: Tekelec, Inc., Morrisville, NC (US)

(72) Inventor: Steven Robert Donovan, Dallas, TX (US)

(73) Assignee: Tekelec, Inc., Morrisville, NC (US)

( * ) Notice: Subject to any disclaimer, the term of this patent is extended or adjusted under 35 U.S.C. 154(b) by 40 days.

This patent is subject to a terminal disclaimer.

(21) Appl. No.: 13/712,481

(22) Filed: Dec. 12, 2012

(65) Prior Publication Data

US 2013/0151845 A1    Jun. 13, 2013

Related U.S. Application Data

(60) Provisional application No. 61/569,627, filed on Dec. 12, 2011.

(51) Int. Cl.
    *H04L 29/06*      (2006.01)

(52) U.S. Cl.
    CPC .................. *H04L 63/0407* (2013.01)

(58) Field of Classification Search
None
See application file for complete search history.

(56) References Cited

U.S. PATENT DOCUMENTS 5,835,087 A * 11/1998 Herz et al. ............... 715/810
8,171,032 B2 * 5/2012 Herz .......................... 707/748
8,626,157 B2    1/2014 Nas et al.
9,094,819 B2    7/2015 McCann et al.
2003/0227894 A1   12/2003 Wang et al.

(Continued)

FOREIGN PATENT DOCUMENTS

CN      1964316      5/2007
EP      1 873 980 A1    1/2008

(Continued)

OTHER PUBLICATIONS

Calhoun et al., "The Diameter Base Protocol", The Internet Society, 2001, p. 1-64.*

(Continued)

*Primary Examiner* — Jeffery Williams
(74) *Attorney, Agent, or Firm* — Jenkins, Wilson, Taylor & Hunt, P.A.

(57) ABSTRACT

The subject matter described herein includes systems, methods, and computer readable media for encrypting Diameter identification information contained in Diameter signaling messages. The system includes a Diameter agent that comprises a network interface configured to receive, from a first Diameter node, a Diameter signaling message that includes Diameter identification information associated with the first Diameter node and a Diameter encryption topology hiding module (ETHM) configured to encrypt the Diameter identification information to generate encrypted Diameter identification information and to replace the Diameter identification information in the Diameter signaling message with the encrypted Diameter identification information. The Diameter agent further includes a routing module configured to route the Diameter signaling message with the encrypted Diameter identification information to a second Diameter node.

26 Claims, 7 Drawing Sheets

(56) References Cited

U.S. PATENT DOCUMENTS

| | | | |
|---|---|---|---|
| 2005/0235000 | A1 | 10/2005 | Keil |
| 2006/0259759 | A1 | 11/2006 | Maino et al. |
| 2008/0010669 | A1* | 1/2008 | Aittola et al. ............... 726/3 |
| 2009/0080440 | A1 | 3/2009 | Balyan et al. |
| 2009/0165017 | A1 | 6/2009 | Syed et al. |
| 2009/0313379 | A1 | 12/2009 | Rydnell et al. |
| 2011/0165901 | A1 | 7/2011 | Baniel et al. |
| 2011/0195710 | A1 | 8/2011 | Nas et al. |
| 2011/0302244 | A1 | 12/2011 | McCann et al. |
| 2012/0155389 | A1* | 6/2012 | McNamee et al. ........... 370/328 |
| 2012/0157047 | A1* | 6/2012 | Chen et al. ................... 455/411 |
| 2012/0158994 | A1* | 6/2012 | McNamee et al. ........... 709/238 |
| 2012/0226814 | A1 | 9/2012 | Stucker |

FOREIGN PATENT DOCUMENTS

| | | |
|---|---|---|
| KR | 10-1506232 | 3/2015 |
| WO | WO 2011/100166 A2 | 8/2011 |
| WO | WO 2011/156274 A2 | 12/2011 |

OTHER PUBLICATIONS

Non-Final Office Action for U.S. Appl. No. 13/154,119 (May 2, 2013).

Communication of European publication number and information on the application of Article 67(3) EPC for European Patent Application No. 11792956.2 (Mar. 13, 2013).

Notification of Transmittal of the International Search Report and the Written Opinion of the International Searching Authority, or the Declaration for International Application No. PCT/US2011/039285 (Feb. 9, 2012).

"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 10)," 3GPP TS 29.272, V10.2.0, pp. 1-95 (Mar. 2011).

Rouse, "Platform," http://searchservervirtualization.techtarget.com/definition/platform, pp. 1-2 (2006-2009).

Calhoun et al., "Diameter Base Protocol," RFC 3588, pp. 1-147 (Sep. 2003).

Calhoun et al., "Diameter Base Protocol,"draft-ietf-aaa-diameter-07, Section 6.3, p. 68 (Jul. 2001).

Non-Final Office Action for U.S. Appl. No. 13/021,402 (Nov. 8, 2012).

Notification of Transmittal of the International Search Report and the Written Opinion of the International Searching Authority, or the Declaration for International Application No. PCT/US2011/023752 (Oct. 26, 2011).

3GPP, "3rd Generation Partnership Project; Technical Specification Group Core Network and Terminals; InterWorking Function (IWF) Between MAP Based and Diameter Based Interfaces (Release 9)," 3GPP TS 29.305 V9.0.0, pp. 1-63 (Dec. 2009).

Notice of Preliminary Rejection for Korean Patent Application No. 2012-7034449 (Apr. 25, 2014).

Advisory Action Before the Filing of an Appeal Brief for U.S. Appl. No. 13/154,119 (Jan. 22, 2014).

Final Office Action for U.S. Appl. No. 13/154,119 (Oct. 25, 2013).

Notice of Allowance and Fee(s) Due for U.S. Appl. No. 13/021,402 (Sep. 9, 2013).

Notice of Allowance and Fee(s) Due for U.S. Appl. No. 13/154,119 (Mar. 17, 2015).

Faragó et al., "Virtual Path Network Topology Optimization Using Random Graphs," INFOCOM '99, Eighteenth Annual Joint Conference of the IEEE Computer and Communications Societies, vol. 2, pp. 491-496 (Mar. 21-25, 1999).

Goldschlag et al., "Hiding Routing Information," Information Hiding Lecture Notes in Computer Science, First International Workshop, vol. 1174, pp. 137-150 (May 30-Jun. 1, 1996).

Notification of the Second Office Action for Chinese Application No. 201180032307.4 (Jul. 17, 2015).

Commonly-assigned, co-pending U.S. Appl. No. 14/795,601 for "Methods, Systems, and Computer Readable Media for Selective Diameter Topology Hiding," (Unpublished, filed Jul. 9, 2015).

Email Regarding Decision to Grant for Korean Patent Application No. 2012-7034449 (Mar. 2, 2015).

Office Action for Korean Patent Application No. 2012-7034449 (Oct. 14, 2014).

Notification of the First Office Action for Chinese Patent Application No. 201180032307.4 (Nov. 4, 2014).

* cited by examiner

METHODS, SYSTEMS, AND COMPUTER READABLE MEDIA FOR ENCRYPTING DIAMETER IDENTIFICATION INFORMATION IN A COMMUNICATION NETWORK

PRIORITY CLAIM

This application claims the benefit of U.S. Provisional Patent Application Ser. No. 61/569,627 filed Dec. 12, 2011; the disclosure of which is incorporated herein by reference in its entirety.

TECHNICAL FIELD

The subject matter described herein relates to methods and systems for communications in a Diameter network. More particularly, the subject matter described herein relates to methods, systems, and computer readable media for encrypting Diameter identification information in a communication network.

BACKGROUND

In Diameter networks, messages and communications between nodes in the network include information identifying the name and location of each node in the network. For example, when a request message is sent to a realm or domain in the network and is routed to the appropriate server, the request message and server's response each include information identifying the client and server, respectively, to each other.

Diameter signaling messages exist in the format of request-answer messages. All answer messages travel back to the request source via the same path through which the request message was routed using hop-by-hop transport. When one Diameter node needs information from another Diameter node, the first Diameter node sends a request identifying itself and its realm or domain, as well as identifying the realm or domain of the Diameter node from which the first Diameter node needs information. The Diameter answer message sent back from the Diameter node that receives the request will include information identifying the receiving Diameter node and its realm or domain.

There are disadvantages associated with providing a requesting node with Diameter node identification and location information. This type of information is generically referred to herein as Diameter node identification information. Providing Diameter node identification information to untrusted parties could pose a security risk. By providing an outside node with a Diameter node's address, the providing Diameter node becomes more susceptible to attacks. Moreover, it might be desirable for a service provider to withhold or hide information about its network topology, such as the number of mobility management entities (MMEs) or home subscriber servers (HSSs) in the network, from its competitors, as an example.

Accordingly, in light of these disadvantages associated with the inclusion of identifying information in Diameter signaling messages, there exists a need for methods, systems, and computer readable media for encrypting Diameter identification information in a communications network.

SUMMARY

The subject matter described herein includes systems, methods, and computer readable media for encrypting Diameter identification information contained in Diameter signaling messages. In one embodiment, the system includes a Diameter agent that comprises a network interface configured to receive, from a first Diameter node, a Diameter signaling message that includes Diameter identification information associated with the first Diameter node and a Diameter encryption topology hiding module (ETHM) configured to encrypt the Diameter identification information to generate encrypted Diameter identification information and to replace the Diameter identification information in the Diameter signaling message with the encrypted Diameter identification information. The Diameter agent further includes a routing module configured to route the Diameter signaling message with the encrypted Diameter identification information to a second Diameter node.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, methods, systems, and computer readable media are provided for encrypting Diameter identification information in a communication network. Reference will now be made in detail to exemplary embodiments of the subject matter described herein, examples of which are illustrated in the accompanying drawings. Wherever possible, the same reference numbers will be used throughout the drawings to refer to the same or like parts. The present subject matter utilizes a Diameter agent, such as a Diameter signaling router (DSR) or Diameter relay agent, which is configured to reside in the core of a wireless communications network. The communication network may include a long term evolution (LTE) network, an Internet protocol multimedia subscriber (IMS) network, or any other network adapted to utilize the Diameter protocol and to facilitate communication between Diameter based agents, clients, servers, proxies, routers, and nodes.

Figure 1:
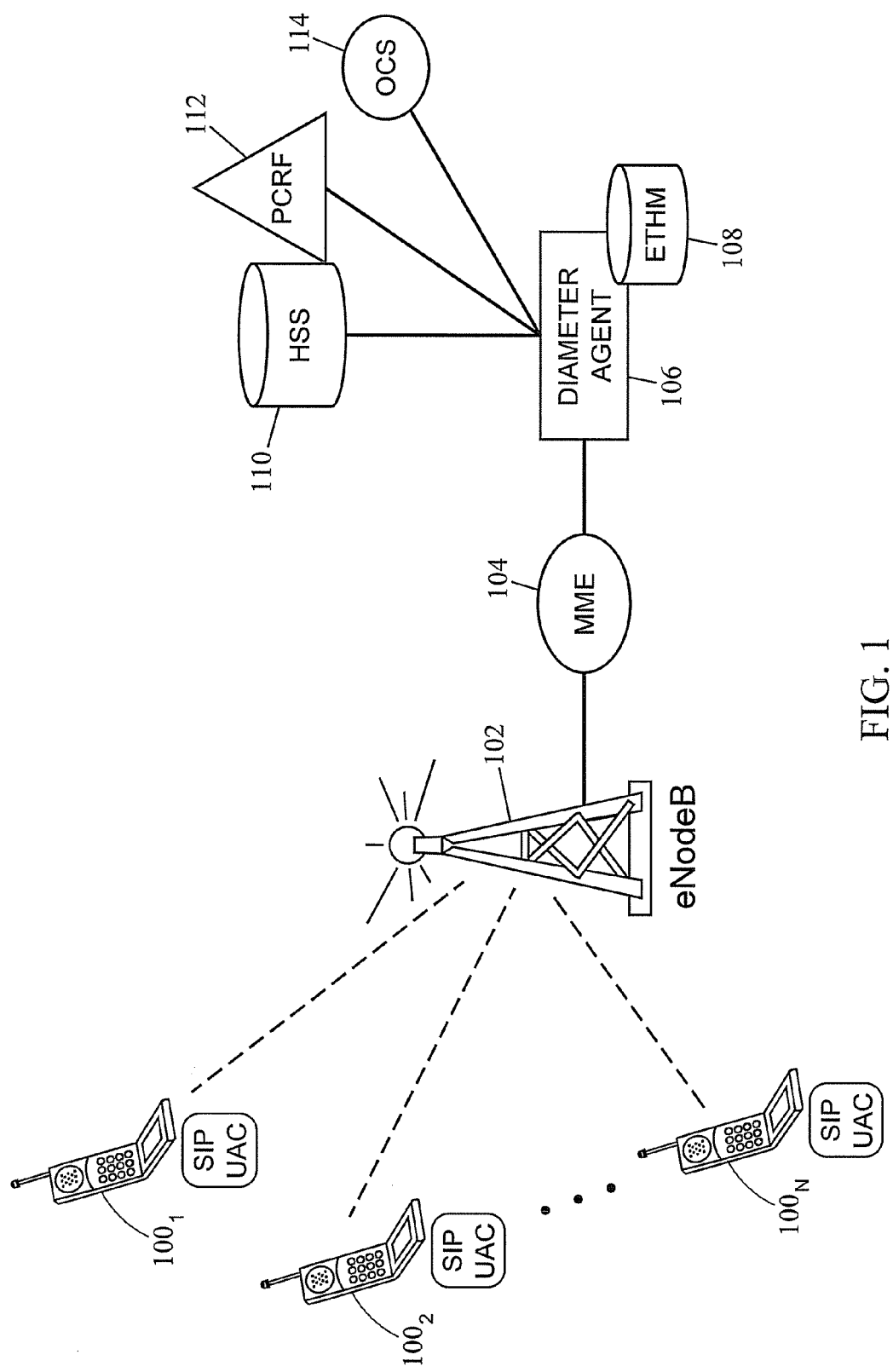
FIG. 1 is a block diagram illustrating an exemplary long term evolution (LTE) network utilizing an encryption-based topology hiding module (ETHM) according to an embodiment of the subject matter described herein.

FIG. 1 is a block diagram illustrating an exemplary LTE network including a Diameter agent according to an embodiment of the subject matter described herein. In FIG. 1, end user devices $100_{1...N}$ (e.g., mobile handsets) are connected to eNodeB 102, which performs radio access functions similar to a base transceiver station (BTS). A mobility management entity (MME) 104 performs authentication and tracking of end user devices 100. MME 104 is communicatively connected to Diameter agent 106, which includes an encryption-based topology hiding module (ETHM) 108 for implementing a Diameter encryption function. As will be described in greater detail below, ETHM 108 encrypts Diameter identification information from received messages so that the secrecy of Diameter topology and node identification information is preserved. In one embodiment, ETHM 108 includes a software based module that is executed by a hardware based processor or processing unit in Diameter agent 106. Examples of Diameter identification information may include any parameter value contained in a Diameter signaling message, such as, but not limited to, an origin-host parameter value, an origin-realm parameter value, a destination-host parameter value, a destination-realm parameter value, a route-record parameter value, or any other parameter value that provides data regarding network topology. Diameter agent 106 may also be further connected to network nodes, such as home subscriber server (HSS) 110 and policy and charging rules function (PCRF) 112. HSS 110 stores mobile subscription data. PCRF 112 provides policy and charging control functions. Diameter agent 106 may also be communicatively connected to other network nodes, such as an online charging system (OCS) 114 and/or an offline charging system (not shown), to provide additional functions and services to network subscribers.

In one embodiment, Diameter agent 106 may be any suitable node capable of receiving and forwarding Diameter signaling messages. In one embodiment, Diameter agent 106 may be a Diameter signaling router (DSR) that routes Diameter signaling messages based on Diameter information contained within the signaling messages. Diameter agent 106 may be, in addition to or instead of a Diameter signaling router, one or more of: a Diameter relay agent, a Diameter proxy agent, a Diameter redirect agent, or a Diameter translation agent, as described in IETF RFC 3588, the disclosure of which is incorporated herein by reference in its entirety.

In one embodiment, Diameter agent 106 includes ETHM 108 that is configured to utilize encryption keys and associated decryption keys for all Diameter signaling messages received at Diameter agent 106. Alternatively, ETHM 108 may select and use different encryption keys and decryption keys based on the particular Diameter connection over which the Diameter signaling messages are received. By utilizing encryption keys and decryption keys, Diameter agent 106 may utilize ETHM 108 to hide the identity of a network element in a stateless manner. Notably, Diameter agent 106 does not need to maintain a mapping table that contains the true Diameter identification information associated with network elements and corresponding masking identifiers (which may be used to replace the identification information in modified messages departing/communicated from Diameter agent 106). In yet another embodiment, ETHM 108 may be configured to select and utilize different encryption and decryption keys based on a particular application-identifier parameter value, a particular Diameter Command-Code parameter value, or a particular destination-realm parameter value contained in the received Diameter signaling message. In one embodiment, the parameter values may include attribute-value pair (AVP) parameter values. Although the following signaling flow diagrams depicted in FIGS. 2-5 provide various instances of encrypting Diameter identification information contained in Diameter signaling messages, other types of Diameter identification information parameters and Diameter signaling messages may be utilized without departing from the scope of the present subject matter. For example, FIGS. 2-5 illustrate the encrypting of identification information contained in Diameter signaling messages, such as Update Location Request (ULR) messages, Update Location Answer (ULA) messages, Cancel Location Request (CLR) messages, and Cancel Location Answer (CLA) messages. However, the encrypting of identification information contained in a Credit-Control-Request (CCR) message, a Credit-Control-Answer (CCA) message, an Accounting-Request (ACR) message, an Accounting-Answer (ACA) message, a Re-Auth-Request (RAR) message, a Re-Auth-Answer (RAA) message, a Location Information Request (LIR) message, a Location Information Answer (LIA) message, and the like may be conducted without departing from the scope of the present subject matter.

Figure 2:
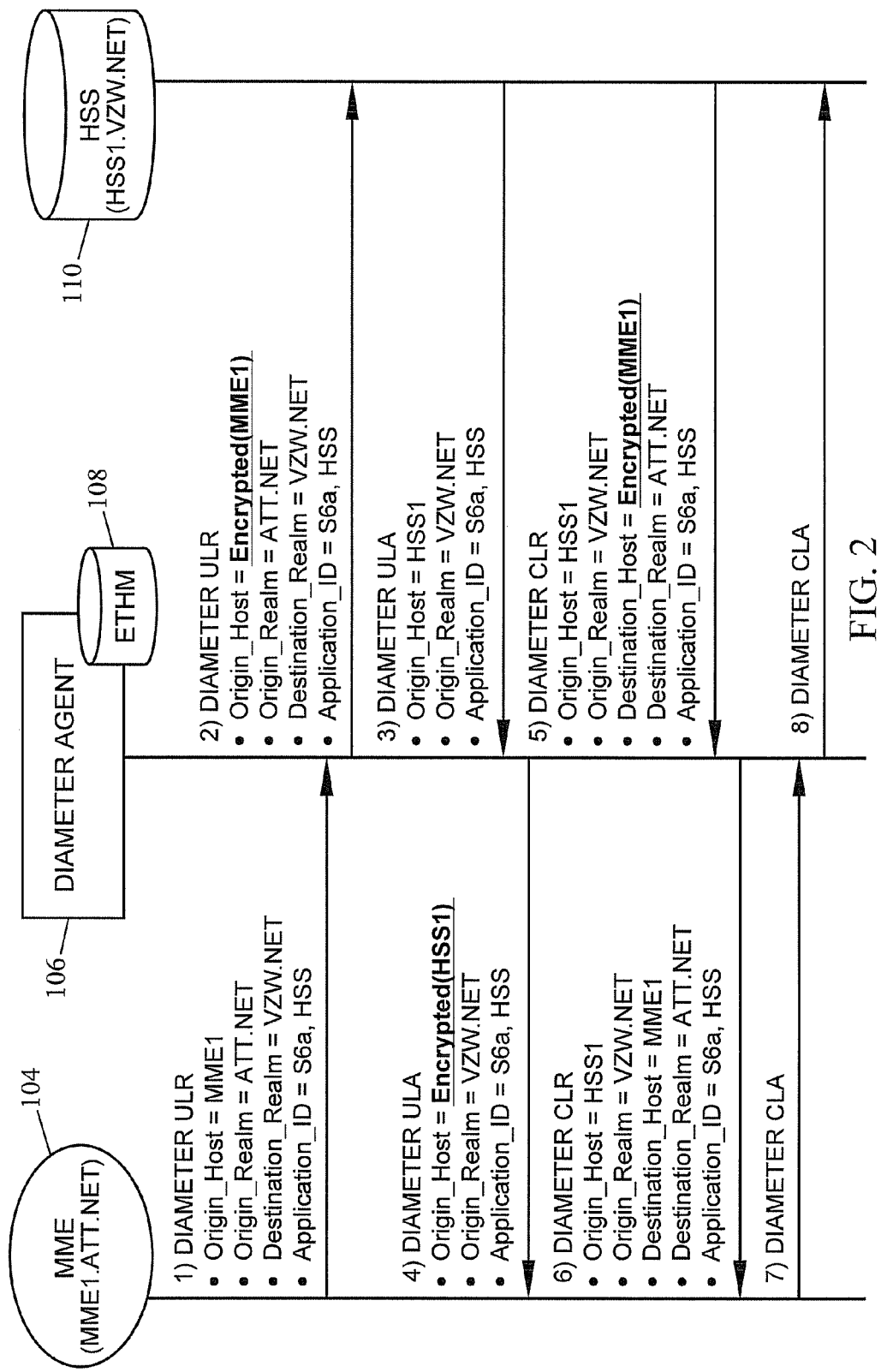
FIG. 2 is a signaling message flow diagram illustrating exemplary Diameter signaling messages received by a Diameter agent configured to encrypt identification information in a Diameter signaling message according to an embodiment of the subject matter described herein.

FIG. 2 depicts a signaling message flow diagram illustrating the encryption of an origin-host parameter value and a destination-host parameter value in Diameter request and answer messages according to an embodiment of the subject matter described herein. In the illustrated example, MME 104 on a host carrier network (e.g., AT&T network) requires information from HSS 110 on a second carrier network (e.g., Verizon network), for a Verizon customer roaming on AT&T's network. In FIG. 2, AT&T's MME 104 does not know the specific host information for Verizon's HSS 110. Instead, MME 104 only knows that the roaming mobile subscriber is a Verizon customer. In message (1), MME 104 sends a Diameter Update Location Request (ULR) message directed to Verizon's domain or realm (e.g., "Destination-Realm=VZW.NET"). In one embodiment, the ULR message includes Diameter identification information (e.g., Diameter AVP parameter values) associated with the origin host and origin realm. Namely, these parameters and respective parameter values are depicted in FIG. 2 as "Origin-Host=MME1" and "Origin-Realm=ATT.NET". The ULR message may also include parameters, such as, but not limited to, a destination realm and an application identifier.

In one embodiment, the ULR message is received by Diameter agent 106, which includes ETHM 108. In the illustrated example, Diameter agent 106 may be associated with the AT&T network (e.g., DSR.ATT.NET). In another embodiment, Diameter agent 106 may reside in an intermediary network that links the AT&T and Verizon networks. Although only one Diameter agent is depicted in FIG. 2, additional Diameter agents provisioned with an ETHM may be utilized without departing from the scope of the present subject matter (e.g., a DSR located in the Verizon destination network, such as DSR.VZN.NET). Diameter agent 106 may be configured to evaluate the message, determine which Verizon HSS serves the mobile subscriber associated with the ULR, and route the message to the appropriate Verizon HSS (e.g., HSS 110) as indicated in message (2). In addition, Diameter agent 106 may also be configured to encrypt the origin-host value in the request message. Similarly, the origin-realm value in the ULR message may optionally be encrypted. As shown in the illustrated example, the Diameter ULR message is modified to include encrypted routing information indicated as "Origin-Host=Encrypted(MME1)". Upon completing the encryption process, Diameter agent 106 may forward the ULR request to the selected destination HSS host.

Upon receiving the ULR request, HSS 110 may then retrieve the requested subscriber information and send a Diameter Update Location Answer (ULA) message intended for MME 104. Namely, the Diameter ULA message may be directed to MME 104 via Diameter agent 106, following a hop-by-hop transport protocol (see message 3). In one embodiment, the ULA message includes Diameter identification information that identifies HSS 110 as the source host, e.g., "Origin-Host=HSS1" and "Origin-Realm=VZW.NET". Upon receiving the Diameter ULA message, Diameter agent 106 is configured to encrypt the origin-host AVP parameter value and subsequently replace the original origin-host AVP parameter value with the encrypted value. In this scenario, Diameter agent 106 is most likely located in an intermediary network and is configured to hide network elements residing in both AT&T and Verizon's networks.

In one embodiment, HSS 110 may also send a Diameter Cancel Location Request (CLR) message (e.g., message 5) intended for MME 104. Namely, the Diameter CLR message may be directed to MME 104 via Diameter agent 106. In one embodiment, the CLR message includes Diameter identification information that identifies HSS 110 as the source host and Verizon has the host realm, e.g., "Origin-Host=HSS1" and "Origin-Realm=VZW.NET". The Diameter CLR message also includes an encrypted destination-host parameter value that identical to the origin-host parameter of the Diameter ULR message received by HSS 110 (e.g., message 2).

Upon receiving the Diameter CLR message, Diameter agent 106 is configured to decrypt the destination-host AVP parameter value and subsequently replace the encrypted Destination host AVP parameter value with the decrypted value. For example, Diameter agent 106 may decrypt the encrypted destination-host AVP parameter value (e.g., "Encrypted (MME1)") to obtain an unencrypted destination-host AVP parameter value (e.g., "MME1") as shown in message 5 in FIG. 2. In such an embodiment, ETHM 108 may utilize a decryption algorithm or key that is associated with the encryption algorithm or key that was originally used to encrypt the origin-host parameter value in the aforementioned Diameter ULR message.

Although not shown in FIG. 2, Diameter agent 106 may also encrypt the specified origin-host AVP parameter value (e.g., "HSS1") to derive an encrypted origin-host AVP parameter value (e.g., "Encrypted(HSS1)") if Diameter agent 106 is configured to hide the origin/identity of HSS 110. In such a scenario, Diameter agent 106 may then replace the origin-host AVP parameter value with the encrypted origin-host AVP parameter value. By using ETHM 108 to encrypt the origin-host AVP parameter value, Diameter agent 106 may protect the identity of the sending host (e.g., HSS 110). In one embodiment, the origin-realm AVP parameter value (e.g., "VZW.NET") may also be encrypted and placed in the Diameter CLR message.

Returning to the example depicted in FIG. 2, MME 104 receives a Diameter CLR message that includes the decrypted destination-host AVP parameter value. MME 104 may respond to the received CLR message by sending a Diameter Cancel Location Answer (CLA) message to HSS 110 via Diameter agent 106.

In one embodiment, a Diameter agent (e.g., DSR) provisioned with an ETHM may be adapted to extract and encrypt an origin-host parameter value included in a received Diameter request message and subsequently append an associated origin-realm parameter value to the encrypted origin-host parameter value. The original origin-host parameter value in the received Diameter message may then be replaced by the combination of the encrypted origin-host parameter value and the origin-realm parameter value. The modified Diameter request message is then routed to a host specified by the destination-realm parameter value in the Diameter request message.

Upon receiving a Diameter request message, such as a Diameter CLR message, associated with the abovementioned modified Diameter request message sent to the destination host, the Diameter agent may be configured to extract the destination-host parameter value from the CLR message. Notably, the destination-host parameter value may include the previously encrypted origin-host parameter value and associated origin-realm parameter value (i.e., to which it was previously appended) as contained in the request message received by the destination host. The encrypted origin-host parameter value is parsed from the destination-host parameter value and decrypted. The decrypted destination-host value may then be used by a Diameter agent to replace the destination-host parameter value in the Diameter CLR message directed to the original MME.

Figure 3:
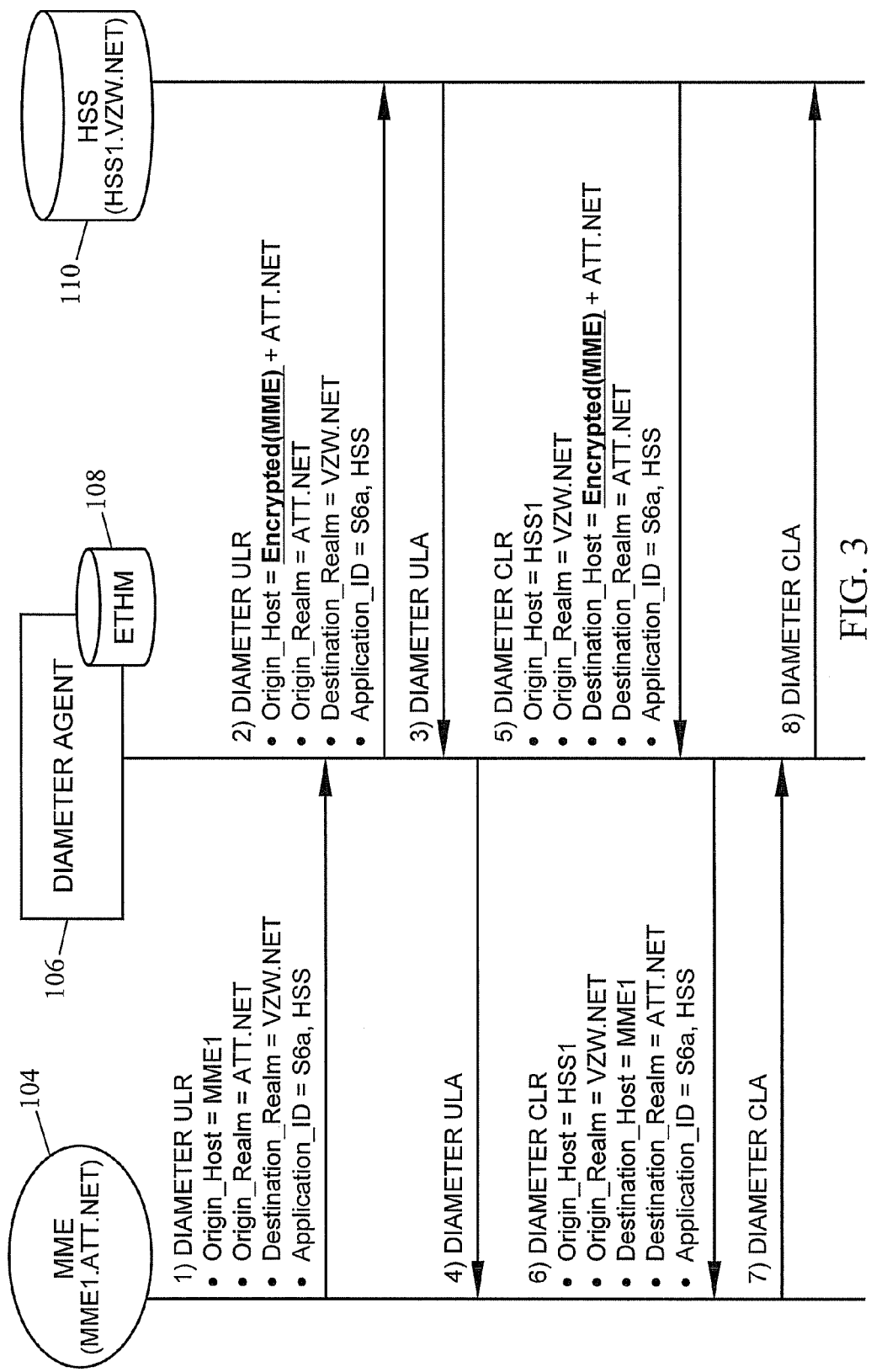
FIG. 3 is a signaling message flow diagram illustrating exemplary Diameter signaling messages received by a Diameter agent configured to encrypt and append identification information in a Diameter signaling message according to an embodiment of the subject matter described herein.

For example, FIG. 3 depicts a signaling message flow diagram illustrating the appending of an origin-realm value to an encrypted origin-host parameter value according to an embodiment of the subject matter described herein. In the illustrated example, MME 104 on a host carrier network (e.g., an AT&T network) requires information from HSS 110 on a second carrier network (e.g., Verizon network), for a Verizon customer roaming on AT&T's network. In FIG. 3, AT&T's MME 104 does not know the specific host information for Verizon's HSS 110. Instead, MME 104 only knows that the roaming mobile subscriber is a Verizon customer. In one embodiment, MME 104 may send a Diameter Update Location Request (ULR) message (e.g., message 1 in FIG. 3) directed to Verizon's domain or realm (e.g., "Destination-Realm=VZW.NET"). The ULR message may also include Diameter identification information associated with the origin host and realm (e.g., "Origin-Host=MME1" and "Origin-Realm =ATT.NET"). The ULR message may also include a destination realm and an application identifier.

In one embodiment, the Diameter ULR message is received by Diameter agent 106, which includes ETHM 108.

In the illustrated example, Diameter agent 106 may be associated with the AT&T network (e.g., DSR.ATT.NET). In another embodiment, Diameter agent 106 may reside in an intermediary network that links the AT&T and Verizon networks. Although only one Diameter agent is depicted in FIG. 3, additional Diameter agents provisioned with an ETHM may be utilized without departing from the scope of the present subject matter (e.g., a DSR located in the Verizon destination network, such as DSR.VZN.NET). Diameter agent 106 may be configured to evaluate the message, determine which Verizon HSS serves the mobile subscriber associated with the ULR, and route the message to the appropriate Verizon HSS (e.g., HSS 110) as indicated in message (2). In one embodiment, Diameter agent 106 detects the received Diameter ULR message as being addressed to a Destination-realm and a particular application indicated by an application identifier. Diameter agent 106 may then encrypt the origin-host AVP parameter value in the originally received ULR message and append the current origin-realm parameter value (e.g., ATT.NET) to the encrypted origin-host AVP parameter value of "Encrypted(MME)". As depicted in FIG. 3, the origin-host value includes an AVP parameter value of "Encrypted(MME1)+ATT.NET". Upon completing the encryption and replacement process, Diameter agent 106 may then forward the Diameter ULR request to the selected destination HSS host (e.g., HSS 110).

Upon receiving the ULR request, HSS 110 may then retrieve the requested subscriber information and send a Diameter Update Location Answer (ULA) message directed to MME 104. The ULA message may subsequently be forwarded to MME 104.

In one embodiment, HSS 110 may send a Diameter CLR message that includes the HSS's host identifier as the origin-host AVP parameter value (e.g., "Origin-Host=HSS1"), and the encrypted+appended value in the destination-host AVP parameter value (e.g., Destination_Host=Encrypted (MME1)+ATT.NET). Notably, the Diameter CLR message may be directed to MME 104 via Diameter agent 106, following a hop-by-hop transport protocol (e.g., message 5 in FIG. 3).

Upon receiving the Diameter CLR message, Diameter agent 106 may be configured to perform a number of functions. In one embodiment, ETHM 108 in Diameter agent 106 may parse the destination-host parameter value to extract the encrypted host-name portion and the unencrypted realm portion. Notably, ETHM 108 may decrypt the encrypted host-name portion of the destination-host value and subsequently use to the decrypted host-name portion to replace the origin-host parameter value in the destination-host AVP parameter value (e.g., in message 6).

In one embodiment, Diameter agent 106 may also optionally encrypt the specified origin-host AVP parameter value (e.g., "HSS1") to derive an encrypted origin-host AVP parameter value (e.g., "Encrypted(HSS1)"). Although not shown in FIG. 3, Diameter agent 106 may be configured to replace the origin-host AVP parameter value (e.g., in message 5) with the encrypted origin-host AVP parameter value (e.g., in message 6). In one embodiment, the origin-realm AVP parameter value (e.g., "VZW.NET") may also be optionally encrypted and placed in the Diameter CLR message. By using ETHM 108 to encrypt the origin host AVP parameter value, Diameter agent 106 may protect the identity of the source host (e.g., HSS 110).

After the encryption and replacement process is completed, Diameter agent 106 forwards the modified CLR message to MME 104. Notably, in the example depicted in FIG. 3, MME 104 receives a Diameter CLR message that includes an unencrypted destination-host AVP parameter value. Furthermore, MME 104 may respond to the received CLR message by sending a Diameter Cancel Location Answer (CLA) message to HSS 110 via Diameter agent 106.

In one embodiment, the ETHM in a Diameter agent may be configured to encrypt the combination of a token value concatenated with an origin-host parameter value in a Diameter signaling message. For example, the token parameter value may include additional, randomly generated, digits or alphanumeric characters. In one embodiment, the token parameter value includes a string of ASCII characters. After the combined/concatenated parameter value is encrypted, the resulting value may then be placed in the origin-host parameter of the Diameter signaling message. For example, a Diameter ULR request message is received by a Diameter agent provisioned with an ETHM.

Figure 4:
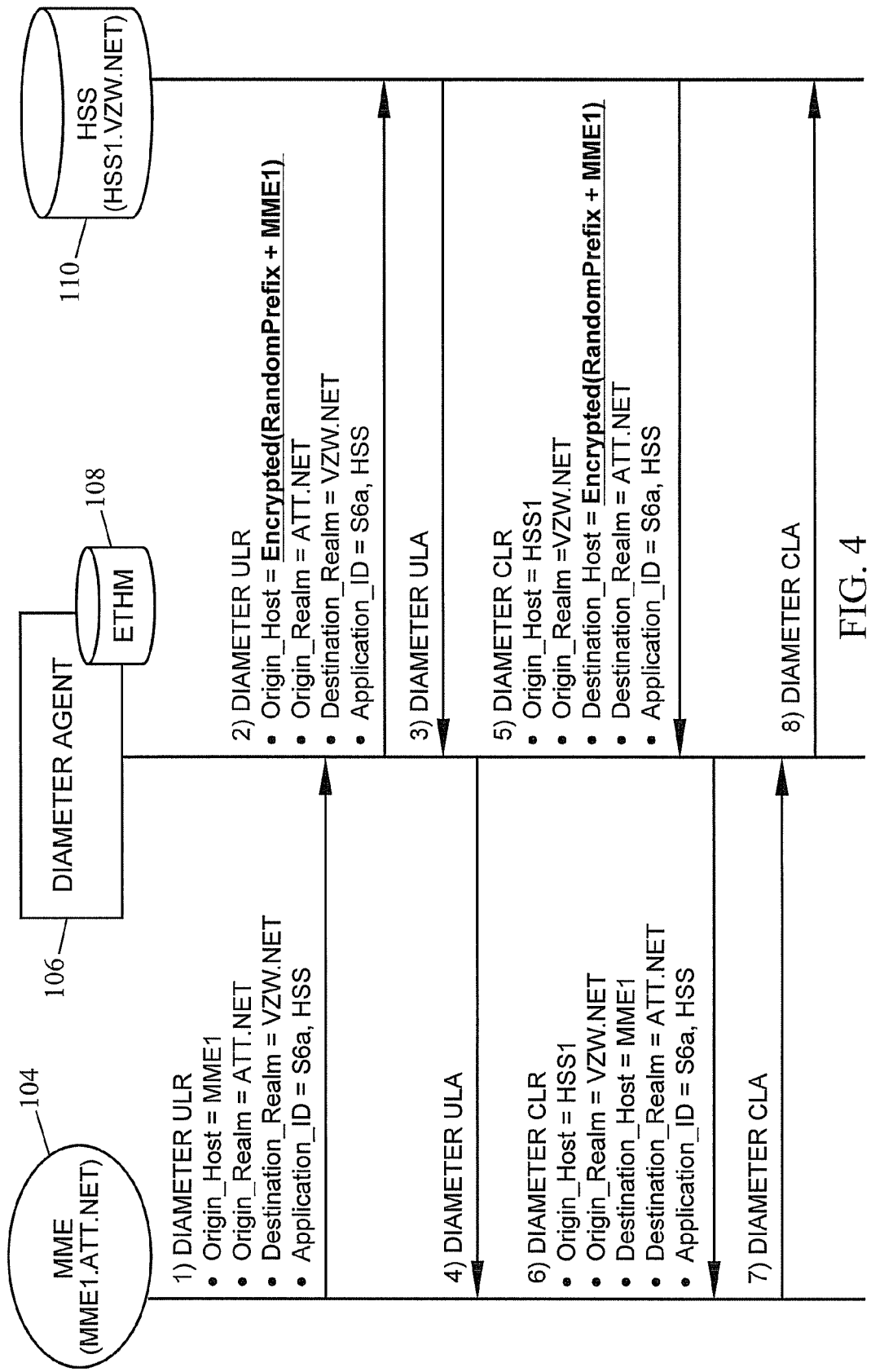
FIG. 4 is a signaling message flow diagram illustrating exemplary Diameter signaling messages received by a Diameter agent configured to encrypt the combination of a token parameter value appended to identification information of a Diameter signaling message according to an embodiment of the subject matter described herein.

FIG. 4 depicts a signaling message flow diagram illustrating the utilization of a token value in the origin-host parameter of Diameter signaling messages according to an embodiment of the subject matter described herein. In the illustrated example, MME 104 on a host carrier network (e.g., AT&T network) requires information from HSS 110 on a second carrier network (e.g., Verizon network), for a Verizon customer roaming on AT&T's network. AT&T's MME 104 does not know the specific host information for Verizon's HSS 110. Instead, MME 104 only knows that the roaming mobile subscriber is a Verizon customer. In one embodiment, MME 104 may send a Diameter Update Location Request (ULR) message (e.g., message 1) directed to Verizon's domain or realm (e.g., "Destination-Realm=VZW.NET"). The ULR message may also include Diameter identification information associated with the origin host and realm (e.g., "Origin-Host=MME1" and "Origin-Realm =ATT.NET"). The ULR message may also include a destination realm and an application identifier.

In one embodiment, the Diameter ULR message is received by Diameter agent 106, which includes ETHM 108. In the illustrated example, Diameter agent 106 may be associated with the AT&T network (e.g., DSR.ATT.NET). In another embodiment, Diameter agent 106 may reside in an intermediary network that links the AT&T and Verizon networks. Although only one Diameter agent is depicted in FIG. 4, additional Diameter agents provisioned with an ETHM may be utilized without departing from the scope of the present subject matter (e.g., a DSR located in the Verizon destination network, such as DSR.VZN.NET). Diameter agent 106 may be configured to evaluate the received message, determine which Verizon HSS serves the roaming subscriber, and route the message to the appropriate Verizon HSS (e.g., HSS 110) as indicated in message 2.

In one embodiment, Diameter agent 106 detects the Diameter ULR message as being addressed to a specific Destination-realm and application indicated by an application identifier. For message 1, Diameter agent 106 may generate a new origin-host AVP parameter value that includes a combination of a random prefix value that is appended to the original origin-host AVP parameter value, wherein the combination is subsequently encrypted (e.g., the Origin-host AVP parameter value="Encrypted (RandomPrefix+MME1)"). In one embodiment, the random prefix may include a fixed-length, randomly generated alphanumeric character/digit sequence. In an alternate embodiment, ETHM 108 may also encrypt the origin-realm value of "ATT.NET". After modifying the Diameter ULR message, Diameter agent 106 may then forward the modified Diameter ULR request to the selected destination HSS host (e.g., HSS 110).

Upon receiving the ULR request, HSS 110 may then retrieve the requested subscriber information and send a Diameter Update Location Answer (ULA) message intended for MME 104. In one embodiment, HSS 110 may respond to the Diameter ULR message with an associated Diameter ULA message. Notably, the Diameter ULA message may be directed to MME 104 via Diameter agent 106, following a hop-by-hop transport protocol (e.g., messages 3 and 4).

In one embodiment, HSS 110 may also send a Diameter Cancel Location Request (CLR) message (e.g., message 5) intended for MME 104. Namely, the Diameter CLR message may be directed to MME 104 via Diameter agent 106. In one embodiment, the CLR message includes Diameter identification information that identifies HSS 110 as the source host and Verizon has the host realm, e.g., "Origin-Host=HSS1" and "Origin-Realm=VZW.NET". The Diameter CLR message also includes an encrypted destination-host parameter value that identical to the origin-host parameter of the Diameter ULR message received by HSS 110 (e.g., message 2). More specifically, the destination-host parameter value of the CLR message may include "Encrypted (RandomPrefix+ MME1)", as indicated above in the ULR message received by HSS 110.

Upon receiving the Diameter CLR message, Diameter agent 106 is configured to decrypt the concatenated destination-host AVP parameter value and subsequently replace the encrypted Destination host AVP parameter value with the decrypted value. In one embodiment, ETHM 108 in Diameter agent 106 may remove the fixed-length, random digit/character sequence appended to the destination-host AVP parameter value in the received ULA message. For example, Diameter agent 106 may decrypt the concatenated destination-host AVP parameter value (e.g., "Encrypted (RandomPrefix+ MME1)") to obtain the unencrypted random token value and the unencrypted host value. In such an embodiment, ETHM 108 may utilize a decryption algorithm or key that is associated with the encryption algorithm or key that was originally used to encrypt the origin-host parameter value in the aforementioned Diameter ULR message. ETHM 108 may then be configured to discard the random token value and modify the destination-host parameter value to include the unencrypted MME1 value (e.g., message 6).

After the encryption and replacement process is completed, Diameter agent 106 forwards the modified CLR message to MME 104. Notably, in the example depicted in FIG. 4, MME 104 may receive a Diameter CLR message that includes an unencrypted destination-host AVP parameter value. Furthermore, MME 104 may respond to the received CLR message by sending a Diameter Cancel Location Answer (CLA) message to HSS 110 via Diameter agent 106.

Figure 5:
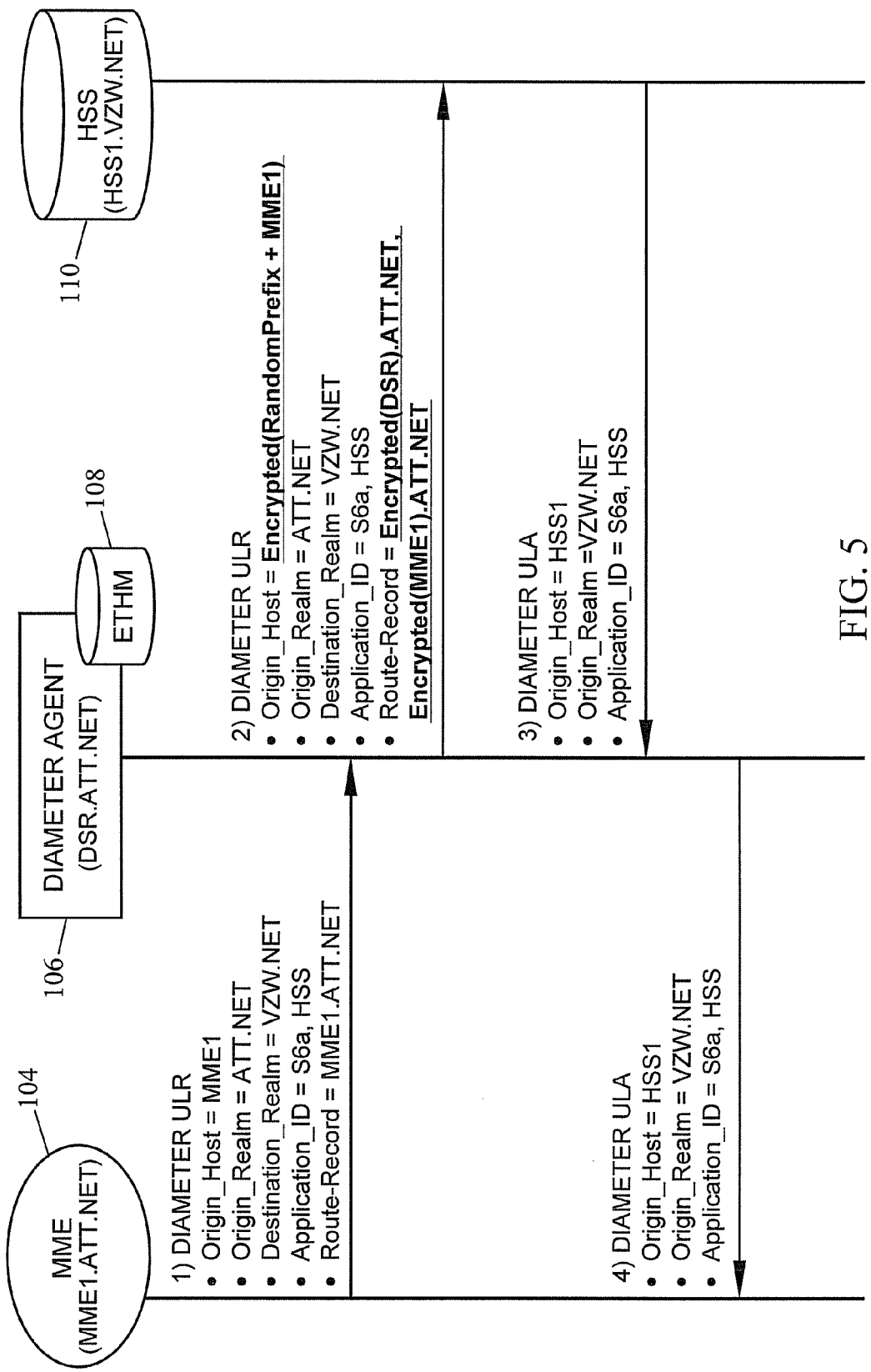
FIG. 5 is a signaling message flow diagram illustrating exemplary Diameter signaling messages received by a Diameter agent configured to encrypt a route-record section of a Diameter signaling message according to an embodiment of the subject matter described herein.

FIG. 5 is a signaling message flow diagram illustrating the encryption of parameter values included in a route-record parameter of a Diameter signaling message according to an embodiment of the subject matter described herein. In the illustrated example, MME 104 on a host carrier network (e.g., AT&T network) requires information from HSS 110 on a second carrier network (e.g., Verizon network), for a Verizon customer roaming on AT&T's network. AT&T's MME 104 does not know the specific host information for Verizon's HSS 110. Instead, MME 104 only knows that the roaming mobile subscriber is a Verizon customer. In one embodiment, MME 104 may send a Diameter Update Location Request (ULR) message (e.g., message 1) directed to Verizon's domain or realm (e.g., "Destination-Realm=VZW.NET"). The ULR message may also include Diameter identification information associated with the origin host and realm (e.g., "Origin-Host=MME1" and "Origin-Realm=ATT.NET"). The ULR message may also include a destination realm and an application identifier.

In one embodiment, the Diameter ULR message is received by Diameter agent 106, which includes ETHM 108. In the illustrated example, Diameter agent 106 may be associated with the AT&T network (e.g., DSR.ATT.NET). In another embodiment, Diameter agent 106 may reside in an intermediary network that links the AT&T and Verizon networks. Although only one Diameter agent is depicted in FIG. 5, additional Diameter agents provisioned with an ETHM may be utilized without departing from the scope of the present subject matter (e.g., a DSR located in the Verizon destination network, such as DSR.VZN.NET). Diameter agent 106 may be configured to evaluate the received message, determine which Verizon HSS serves the roaming subscriber, and route the message to the appropriate Verizon HSS (e.g., HSS 110) as indicated in message 2.

In one embodiment, Diameter agent 106 detects the Diameter ULR message as being addressed to a specific Destination-realm and application indicated by an application identifier. For message 1, Diameter agent 106 may then generate a new origin-host AVP parameter value that includes a combination of a random prefix value that is appended to an origin-host AVP parameter value, the combination of which is encrypted (e.g., the origin-host AVP parameter value=Encrypted (RandomPrefix+MME1)"). In one embodiment, the random prefix may include a fixed-length, randomly generated alphanumeric character/digit sequence. In addition, ETHM 108 may be further configured to encrypt the origin-host name information in all route-record AVP parameter values. As shown in FIG. 5, the Route-Record AVP parameter value may include "Encrypted(DSR).ATT.NET, Encrypted(MME1).ATT.NET", wherein DSR.ATT.NET corresponds to Diameter agent 106 and MME1 corresponds to MME 104. After modifying the Diameter ULR message, Diameter agent 106 may then forward the Diameter ULR request to the selected destination HSS host (e.g., HSS 110).

Upon receiving the ULR request, HSS 110 may then retrieve the requested subscriber information and send a Diameter Update Location Answer (ULA) message intended for MME 104 via Diameter agent 106 (e.g., messages 3 and 4).

Figure 6:
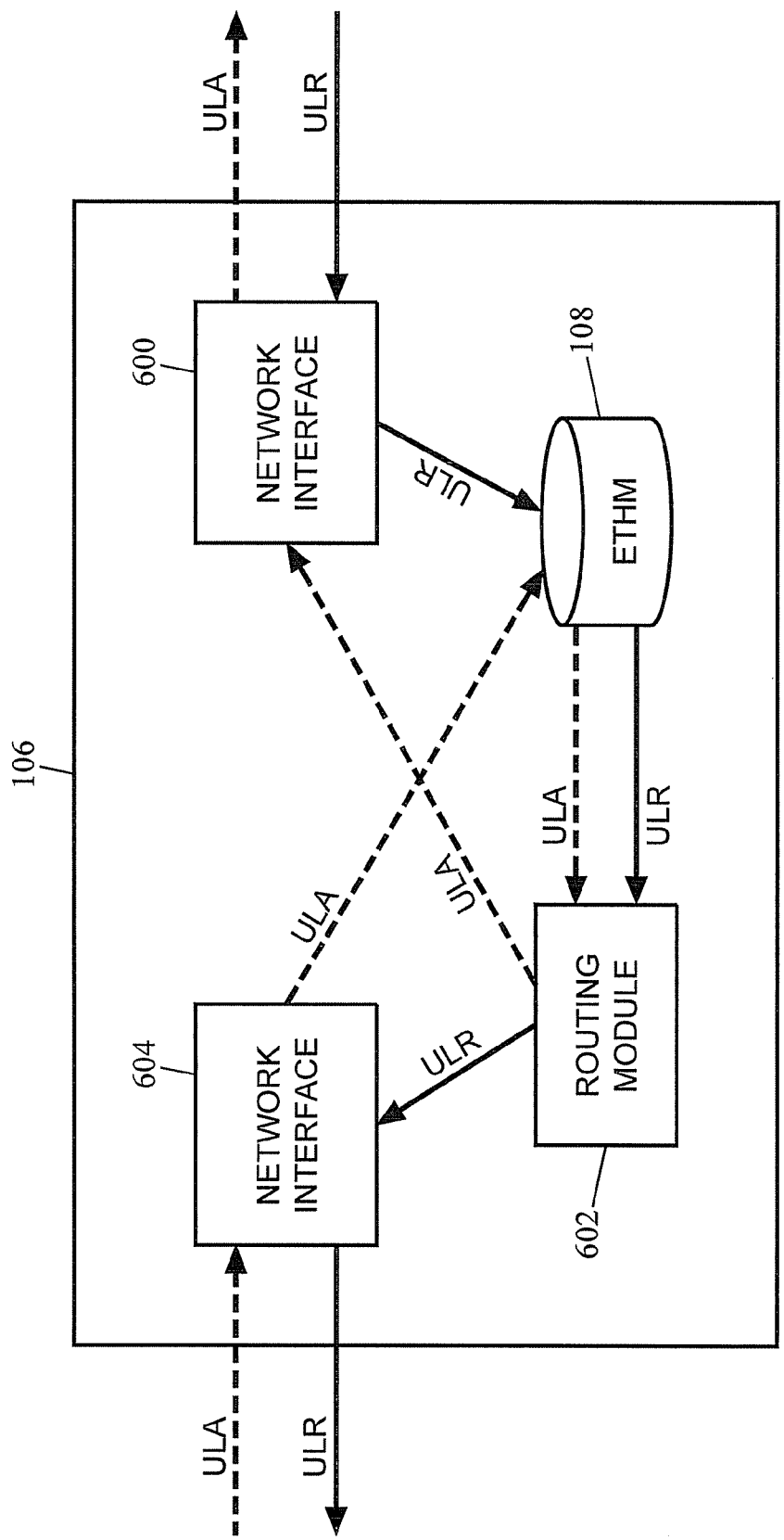
FIG. 6 is a block diagram illustrating an exemplary Diameter agent according to an embodiment of the subject matter described herein.

FIG. 6 is a block diagram illustrating an exemplary Diameter agent according to an embodiment of the subject matter described herein. A Diameter agent, such as Diameter agent 106, includes one or more network interfaces, such as network interfaces 600 and 604, a routing module 802, and an ETHM 108 for implementing an encryption-based path topology hiding function. It will be understood that Diameter agent 106 may comprise additional components and is not limited to only the components shown in FIG. 6.

In one embodiment, Diameter agent 106 receives a message, such as a Diameter Update Location Request (ULR) message, at a network interface such as network interface 600. The message is passed to the ETHM 108, which then determines if the message needs to be modified before being routed to its destination. In this example, the URL message is not modified and subsequently forwarded to routing module 602. Routing module 602 determines the appropriate destination of the message and routes it through a network interface such as network interface 604.

Diameter agent 106 also receives a response message, such as a Diameter Update Location Answer (ULA) message, at a network interface 604. The ULA is passed to ETHM 108, which then determines the message needs to be modified to encrypt the identity of the origin host. ETHM 108 modifies the message (e.g., encrypt the origin host name and/or origin realm name) accordingly and passes the modified ULA message to routing module 602. Routing module 602 then routes the message to its destination via network interface 600.

Although ETHM 108 and routing module 602 are shown here as distinct components of Diameter agent 106, ETHM 108 and routing module 602 may be integrated within the same hardware chip or executed by the same processor.

Figure 7:
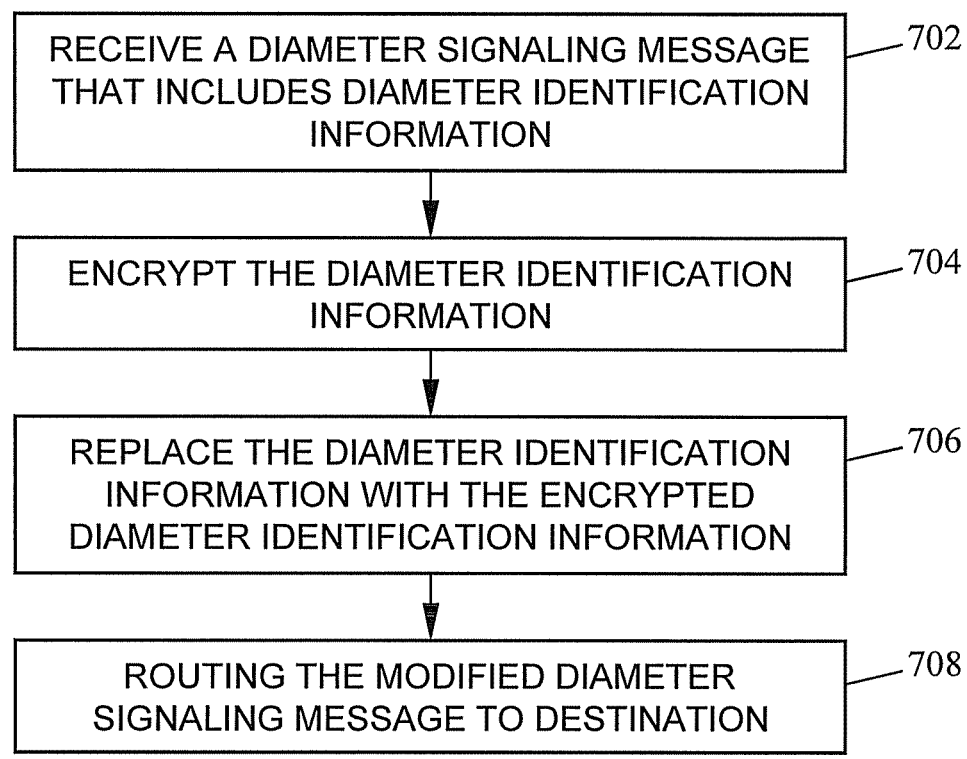
FIG. 7 is a flow chart illustrating an exemplary process for encrypting the identity of a Diameter node in a communication network according to an embodiment of the subject matter described herein.

FIG. 7 is a flow chart illustrating an exemplary process for encrypting the identity of a Diameter node in a communication network according to an embodiment of the subject matter described herein. In block 702, a Diameter signaling message is received. In one embodiment, a DSR may receive a Diameter request message (e.g., Diameter Update Location Request (ULR) message) that is addressed to a destination. Notably, the ULR message may include Diameter identification information associated with a destination Diameter node, such as a destination-realm attribute value pair (AVP) parameter value, an application-identifier AVP parameter value, an origin-host identifier AVP parameter value, and an origin-realm AVP parameter value.

In block 704, at least a portion of the Diameter Identification information is encrypted. In one embodiment, the receiving DSR may be provisioned with an EHTM that is configured to process the Diameter signaling message. For example, the ETHM may be configured for extracting the origin-host value and the origin-realm value from the request message and encrypting the origin-host value and the origin-realm value using an encryption algorithm.

In block 706, the Diameter identification information in the Diameter signaling message is replaced. In one embodiment, the ETHM in the DSR is configured for replacing the original origin-host value in the request message with the encrypted origin-host value and/or replacing the original origin-realm value in the request message with the encrypted origin-realm value.

In block 708, the modified Diameter signaling message is routed to the destination. In one embodiment, the DSR is configured for routing the request message containing the encrypted origin-host parameter value and/or the encrypted origin-realm parameter value towards the destination Diameter node.

In one embodiment, if the DSR subsequently receives an associated Diameter answer message that includes a previously-encrypted origin-host value and origin-realm value, then the DSR with the ETHM is configured to perform a number of tasks. For example, the DSR may extract the encrypted destination-host value and encrypted destination-realm value, decrypt the encrypted destination-host and destination-realm values. The DSR may also be configured to replace the encrypted destination-host value in the Answer message with the decrypted destination-host value, replace the encrypted destination-realm value in the answer message with the decrypted destination-realm value, and route modified answer message to the destination Diameter host.

With regard to the received answer message scenario described above, the DSR with the ETHM may also be adapted to extract the origin-host value and the origin-realm value from the Answer message and encrypt the origin-host value and the origin-realm value using an encryption algorithm. The DSR may also replace the original origin-host value in the Answer message with the encrypted origin-host value, replace the original origin-realm value in the Answer message with the encrypted origin-realm value, and route the modified answer message towards the Diameter request message originator.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for encrypting Diameter identification information contained in Diameter signaling messages, the system comprising:
a Diameter agent including:
a network interface configured to receive, from a first Diameter node, a Diameter signaling message that includes Diameter identification information associated with the first Diameter node;
a Diameter encryption topology hiding module (ETHM) configured to encrypt the Diameter identification information to generate encrypted Diameter identification information and to replace the Diameter identification information in the Diameter signaling message with the encrypted Diameter identification information, wherein the encrypted Diameter identification information includes a token value that is appended to the Diameter identification information such that a combination of the appended token value and Diameter identification information is encrypted by the Diameter ETHM to generate the encrypted Diameter identification information, wherein the appended token value includes randomly generated alphanumeric characters; and
a routing module configured to route the Diameter signaling message with the encrypted Diameter identification information to a second Diameter node.

2. The system of claim 1 wherein the Diameter agent is further configured to receive, from the second Diameter node, a second Diameter signaling message that includes the encrypted Diameter identification information, the Diameter ETHM is further configured to decrypt the encrypted Diameter identification information and to replace the encrypted Diameter identification information in the second Diameter signaling message with the decrypted Diameter identification information, and the routing module is further configured to route the second Diameter signaling message to the first Diameter node.

3. The system of claim 2 wherein the ETHM utilizes an encryption key to encrypt the Diameter identification information in the Diameter signaling message and utilizes a decryption key that is associated with the encryption key to decrypt the encrypted Diameter identification information in the second Diameter signaling message.

4. The system of claim 1 wherein the Diameter agent includes at least one of: a Diameter signaling router (DSR), a Diameter relay agent, a Diameter proxy agent, a Diameter redirect agent, and a Diameter translation agent.

5. The system of claim 1 wherein the first Diameter node includes either a home subscriber server (HSS) or a mobility management entity (MME).

6. The system of claim 1 wherein the second Diameter node includes a mobility management entity (MME), a home subscriber server (HSS), a policy charging and rules function (PCRF) node, an online charging system (OCS) node, or an offline charging system (OFCS) node.

7. The system of claim 1 wherein the Diameter signaling message includes one of an Update Location Request (ULR) message, an Update Location Answer (ULA) message, a Cancel Location Request (CLR) message, a Cancel Location Answer (CLA) message, a Credit-Control-Request (CCR) message, a Credit-Control-Answer (CCA) message, an Accounting-Request (ACR) message, an Accounting-Answer (ACA) message, a Re-Auth-Request (RAR) message, a Re-Auth-Answer (RAA) message, a Location Information Request (LIR) message, and a Location Information Answer (LIA) message.

8. The system of claim 1 wherein the Diameter identification information contained in the Diameter signaling message includes at least one of: an origin-host parameter value, an origin-realm parameter value, a destination-host parameter value, a destination-realm parameter value, and a route-record parameter value.

9. The system of claim 8 wherein at least one of the parameter values included in the Diameter identification information comprises an attribute-value pair (AVP) parameter value.

10. The system of claim 8 wherein the Diameter ETHM is configured to append the token value to at least one of the parameter values included in the Diameter identification information.

11. The system of claim 10 wherein the token value includes a string of random alphanumeric characters of a predetermined length.

12. The system of claim 10 wherein a combination of the token value and the at least one of the parameter values is encrypted.

13. The system of claim 1 wherein the Diameter agent communicates the Diameter signaling message in a stateless manner.

14. A method for encrypting Diameter identification information in a communication network, the method comprising:
at a Diameter signaling router:
receiving, by the Diameter signaling router from a first Diameter node, a Diameter signaling message that includes Diameter identification information associated with the first Diameter node;
encrypting, by the Diameter signaling router, the Diameter identification information to generate encrypted Diameter identification information, wherein the encrypted Diameter identification information includes a token value that is appended to the Diameter identification information such that a combination of the appended token value and Diameter identification information is encrypted by the Diameter ETHM to generate the encrypted Diameter identification information, wherein the appended token value includes randomly generated alphanumeric characters;
replacing, by the Diameter signaling router, the Diameter identification information in the Diameter signaling message with the encrypted Diameter identification information; and
routing, by the Diameter signaling router, the Diameter signaling message with the encrypted Diameter identification information to a second Diameter node.

15. The method of claim 14 comprising:
receiving, from the second Diameter node, a second Diameter signaling message that includes the encrypted Diameter identification information;
decrypting the encrypted Diameter identification information;
replacing the encrypted Diameter identification information in the second Diameter signaling message with the decrypted Diameter identification information; and
routing the second Diameter signaling message to the first Diameter node.

16. The method of claim 15 wherein encrypting the Diameter identification information includes utilizing an encryption key to encrypt encrypting the Diameter identification information in the Diameter signaling message and decrypting the encrypting Diameter identification information includes utilizing a decryption key that is associated with the encryption key to decrypt the encrypted Diameter identification information in the second Diameter signaling message.

17. The method of claim 14 wherein the first Diameter node includes either a home subscriber server (HSS) or a mobility management entity (MME).

18. The method of claim 14 wherein the second Diameter node includes a mobility management entity (MME), a home subscriber server (HSS), a policy charging and rules function (PCRF) node, an online charging system (OCS) node, or an offline charging system (OFCS) node.

19. The method of claim 14 wherein the Diameter signaling message includes one of an Update Location Request (ULR) message, an Update Location Answer (ULA) message, a Cancel Location Request (CLR) message, a Cancel Location Answer (CLA) message, a Credit-Control-Request (CCR) message, a Credit-Control-Answer (CCA) message, an Accounting-Request (ACR) message, an Accounting-Answer (ACA) message, a Re-Auth-Request (RAR) message, a Re-Auth-Answer (RAA) message, a Location Information Request (LIR) message, and a Location Information Answer (LIA) message.

20. The method of claim 14 wherein the Diameter identification information contained in the Diameter signaling message includes at least one of: an origin-host parameter value, an origin-realm parameter value, a destination-host parameter value, a destination-realm parameter value, and a route-record parameter value.

21. The method of claim 20 wherein at least one of the parameter values included in the Diameter identification information comprises an attribute-value pair (AVP) parameter value.

22. The method of claim 20 comprising appending the token value to at least one of the parameter values included in the Diameter identification information.

23. The method of claim 22 wherein the token value includes a string of random alphanumeric characters of a predetermined length.

24. The method of claim 20 wherein a combination of the token value and the at least one of the parameter values is encrypted.

25. The method of claim 14 wherein the Diameter signaling router communicates the Diameter signaling message in a stateless manner.

26. A non-transitory computer readable medium having stored thereon executable instructions that when executed by the processor of a computer control the computer to perform steps comprising:
receiving, from a first Diameter node, a Diameter signaling message that includes Diameter identification information associated with the first Diameter node;
encrypting the Diameter identification information to generate encrypted Diameter identification information, wherein the encrypted Diameter identification information includes a token value that is appended to the Diameter identification information such that a combination of the appended token value and Diameter identification information is encrypted by the Diameter ETHM to generate the encrypted Diameter identification information, wherein the appended token value includes randomly generated alphanumeric characters;
replacing the Diameter identification information in the Diameter signaling message with the encrypted Diameter identification information; and routing the Diameter signaling message with the encrypted Diameter identification information to a second Diameter node.

\* \* \* \* \*